United States Patent
Bayer et al.

(10) Patent No.: US 8,683,108 B2
(45) Date of Patent: Mar. 25, 2014

(54) CONNECTED INPUT/OUTPUT HUB MANAGEMENT

(75) Inventors: Gerd K. Bayer, Stuttgart (DE); Beth A. Glendening, Poughkeepsie, NY (US); Thomas A. Gregg, Highland, NY (US); Michael Jung, Frankfurt am Main (DE); Elke G. Nass, Ehningen (DE); Peter K. Szwed, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 12/821,248

(22) Filed: Jun. 23, 2010

(65) Prior Publication Data
US 2011/0320670 A1    Dec. 29, 2011

(51) Int. Cl.
*G06F 13/36* (2006.01)

(52) U.S. Cl.
USPC .......................... 710/311; 711/170

(58) Field of Classification Search
USPC ................. 710/305–306, 310–313; 711/170; 709/226
See application file for complete search history.

(56) References Cited

U.S. PATENT DOCUMENTS

| | | |
|---|---|---|
| 5,170,472 A | 12/1992 | Cwiakala et al. |
| 5,282,274 A | 1/1994 | Liu |
| 5,430,856 A | 7/1995 | Kinoshita |
| 5,438,575 A | 8/1995 | Bertrand |
| 5,465,332 A | 11/1995 | Deloye et al. |
| 5,465,355 A | 11/1995 | Cook et al. |
| 5,535,352 A | 7/1996 | Bridges et al. |
| 5,551,013 A | 8/1996 | Beausoleil et al. |
| 5,568,365 A | 10/1996 | Hahn et al. |
| 5,574,873 A | 11/1996 | Davidian |
| 5,600,805 A | 2/1997 | Fredericks et al. |
| 5,617,554 A | 4/1997 | Alpert et al. |
| 5,742,785 A | 4/1998 | Stone et al. |
| 5,761,448 A | 6/1998 | Adamson et al. |
| 2008/0091851 A1 | 4/2008 | Sierra |

(Continued)

FOREIGN PATENT DOCUMENTS

| | | |
|---|---|---|
| CN | 1885096 A | 12/2006 |
| CN | 101196615 A | 6/2008 |

(Continued)

OTHER PUBLICATIONS

Dolphin Interconnect Solutions; MySQL Acceleration Solutions; Solid State Storage; Embeded and HPC Solutions; "DXH510 PCI Express Host Adapter"; ww.dolphinics.com/products/pent-dxseries-dsh510.html downloaded Jun. 10, 2010.

(Continued)

*Primary Examiner* — Clifford Knoll
(74) *Attorney, Agent, or Firm* — Cantor Colburn LLP; Steven Chiu (57) ABSTRACT

A method for implementing connected input/output (I/O) hub configuration and management includes configuring a first I/O hub in wrap mode with a second I/O hub. The hubs are communicatively coupled via a wrap cable. The method further includes generating data traffic on a computing subsystem that includes the hubs. Generating traffic includes: converting, via the first hub, a request to implement a transaction into an I/O device-readable request packet and transmitting the request packet over the wrap cable; converting, via the second hub, the I/O device-readable (IODR) request packet into a system readable request and transmitting the request over a system bus; converting, via the second hub, the response to an IODR response packet, and transmitting the response packet over the wrap cable; and converting, via the first hub, the IODR response packet into a system readable response packet, and transmitting the response packet over the system bus.

21 Claims, 4 Drawing Sheets

(56) References Cited

U.S. PATENT DOCUMENTS

| | | |
|---|---|---|
| 2008/0091868 A1 | 4/2008 | Mizrachi et al. |
| 5,790,825 A | 8/1998 | Traut |
| 5,815,647 A | 9/1998 | Buckland et al. |
| 5,838,960 A | 11/1998 | Harriman, Jr. |
| 5,870,598 A | 2/1999 | White et al. |
| 5,960,213 A | 9/1999 | Wilson |
| 6,009,261 A | 12/1999 | Scalzi et al. |
| 6,023,736 A | 2/2000 | Lambeth et al. |
| 6,067,595 A | 5/2000 | Lindenstruth |
| 6,205,530 B1 | 3/2001 | Kang |
| 6,308,255 B1 | 10/2001 | Gorishek, IV et al. |
| 6,330,656 B1 | 12/2001 | Bealkowski et al. |
| 6,349,380 B1 | 2/2002 | Shahidzadeh et al. |
| 6,362,942 B2 | 3/2002 | Drapkin et al. |
| 6,408,347 B1 | 6/2002 | Smith et al. |
| 6,456,498 B1 | 9/2002 | Larson et al. |
| 6,463,582 B1 | 10/2002 | Lethin et al. |
| 6,519,645 B2 | 2/2003 | Markos et al. |
| 6,523,140 B1 | 2/2003 | Arndt et al. |
| 6,529,978 B1 | 3/2003 | Eide et al. |
| 6,544,311 B1 | 4/2003 | Walton et al. |
| 6,578,191 B1 | 6/2003 | Boehme et al. |
| 6,615,305 B1 | 9/2003 | Olesen et al. |
| 6,625,169 B1 | 9/2003 | Tofano |
| 6,643,727 B1 | 11/2003 | Arndt et al. |
| 6,654,818 B1 | 11/2003 | Thurber |
| 6,658,599 B1 | 12/2003 | Linam et al. |
| 6,704,831 B1 | 3/2004 | Avery |
| 6,721,813 B2 | 4/2004 | Owen et al. |
| 6,721,839 B1 | 4/2004 | Bauman et al. |
| 6,772,264 B1 | 8/2004 | Dayan et al. |
| 6,816,590 B2 | 11/2004 | Pike et al. |
| 6,845,469 B2 | 1/2005 | Hicks et al. |
| 6,901,537 B2 | 5/2005 | Dawkins et al. |
| 6,907,510 B2 | 6/2005 | Bennett et al. |
| 6,927,975 B2 | 8/2005 | Crippen et al. |
| 6,950,438 B1 | 9/2005 | Owen et al. |
| 6,963,940 B1 | 11/2005 | Glassen et al. |
| 6,970,992 B2 | 11/2005 | Gurumoorthy et al. |
| 6,973,510 B2 | 12/2005 | Arndt et al. |
| 6,978,338 B2 | 12/2005 | Wang et al. |
| 6,996,638 B2 | 2/2006 | Brice, Jr. et al. |
| 7,003,615 B2 | 2/2006 | Chui et al. |
| 7,042,734 B2 | 5/2006 | Hensley et al. |
| 7,062,594 B1 | 6/2006 | Sardella et al. |
| 7,065,598 B2 | 6/2006 | Connor et al. |
| 7,093,155 B2 | 8/2006 | Aoki |
| 7,103,808 B2 | 9/2006 | Kitamorn et al. |
| 7,107,384 B1 | 9/2006 | Chen et al. |
| 7,107,495 B2 | 9/2006 | Kitamorn et al. |
| 7,127,599 B2 | 10/2006 | Brice, Jr. et al. |
| 7,130,938 B2 | 10/2006 | Brice, Jr. et al. |
| 7,139,940 B2 | 11/2006 | Arbeitman et al. |
| 7,174,550 B2 | 2/2007 | Brice, Jr. et al. |
| 7,177,961 B2 | 2/2007 | Brice, Jr. et al. |
| 7,200,704 B2 | 4/2007 | Njoku et al. |
| 7,206,946 B2 | 4/2007 | Sakakibara et al. |
| 7,209,994 B1 | 4/2007 | Klaiber et al. |
| 7,260,664 B2 | 8/2007 | Arndt et al. |
| 7,277,968 B2 | 10/2007 | Brice, Jr. et al. |
| 7,296,120 B2 | 11/2007 | Corrigan et al. |
| 7,302,692 B2 | 11/2007 | Bae et al. |
| 7,334,107 B2 | 2/2008 | Schoinas et al. |
| 7,340,582 B2 | 3/2008 | Madukkarumukumana et al. |
| 7,370,224 B1 | 5/2008 | Jaswa et al. |
| 7,380,041 B2 | 5/2008 | Belmar et al. |
| 7,398,343 B1 | 7/2008 | Marmash et al. |
| 7,412,488 B2 | 8/2008 | Jha et al. |
| 7,418,572 B2 | 8/2008 | Hepkin |
| 7,420,931 B2 | 9/2008 | Nanda et al. |
| 7,444,493 B2 | 10/2008 | Schoinas et al. |
| 7,447,934 B2 | 11/2008 | Dasari et al. |
| 7,454,548 B2 | 11/2008 | Belmar et al. |
| 7,457,900 B2 | 11/2008 | Panesar |
| 7,475,183 B2 | 1/2009 | Traut et al. |
| 7,480,303 B1 | 1/2009 | Ngai |
| 7,493,425 B2 | 2/2009 | Arndt et al. |
| 7,496,707 B2 | 2/2009 | Freking et al. |
| 7,506,087 B2 | 3/2009 | Ho et al. |
| 7,519,647 B2 | 4/2009 | Carlough et al. |
| 7,525,957 B2 | 4/2009 | Scherer et al. |
| 7,529,860 B2 | 5/2009 | Freimuth et al. |
| 7,530,071 B2 | 5/2009 | Billau et al. |
| 7,546,386 B2 | 6/2009 | Arndt et al. |
| 7,546,406 B2 | 6/2009 | Armstrong et al. |
| 7,546,487 B2 | 6/2009 | Marisetty et al. |
| 7,549,090 B2 | 6/2009 | Bailey et al. |
| 7,552,298 B2 | 6/2009 | Bestler |
| 7,562,366 B2 | 7/2009 | Pope et al. |
| 7,565,463 B2 | 7/2009 | Johnsen et al. |
| 7,567,567 B2 | 7/2009 | Muller et al. |
| 7,587,531 B2 | 9/2009 | Brice, Jr. et al. |
| 7,594,144 B2 | 9/2009 | Brandyberry et al. |
| 7,600,053 B2 | 10/2009 | Carlson et al. |
| 7,606,965 B2 | 10/2009 | Njoku et al. |
| 7,613,847 B2 | 11/2009 | Kjos et al. |
| 7,617,340 B2 | 11/2009 | Gregg |
| 7,617,345 B2 | 11/2009 | Clark et al. |
| 7,624,235 B2 | 11/2009 | Wadhawan et al. |
| 7,627,723 B1 | 12/2009 | Buck et al. |
| 7,631,097 B2 | 12/2009 | Moch et al. |
| 7,660,912 B2 | 2/2010 | Gregg |
| 7,664,991 B1 | 2/2010 | Gunda et al. |
| 7,676,617 B2 | 3/2010 | Kloeppner |
| 7,729,316 B2 | 6/2010 | Uhlik |
| 7,836,254 B2 | 11/2010 | Gregg et al. |
| 7,975,076 B2 | 7/2011 | Moriki et al. |
| 8,140,917 B2 | 3/2012 | Suetsugu et al. |
| 8,510,592 B1 | 8/2013 | Chan |
| 2003/0056155 A1 | 3/2003 | Austen et al. |
| 2003/0058618 A1 | 3/2003 | Soetemans et al. |
| 2003/0198180 A1 | 10/2003 | Cambron |
| 2004/0088604 A1 | 5/2004 | Bland et al. |
| 2004/0117534 A1 | 6/2004 | Parry et al. |
| 2004/0133819 A1 | 7/2004 | Krishnamurthy et al. |
| 2004/0136130 A1 | 7/2004 | Wimmer et al. |
| 2004/0199700 A1 | 10/2004 | Clayton |
| 2005/0033895 A1 | 2/2005 | Lueck et al. |
| 2005/0071472 A1 | 3/2005 | Arndt et al. |
| 2005/0091438 A1 | 4/2005 | Chatterjee |
| 2005/0144533 A1 | 6/2005 | LeVangia et al. |
| 2005/0146855 A1 | 7/2005 | Brehm et al. |
| 2005/0182862 A1 | 8/2005 | Ritz et al. |
| 2005/0286187 A1 | 12/2005 | Liu et al. |
| 2005/0289271 A1 | 12/2005 | Martinez et al. |
| 2006/0053339 A1 | 3/2006 | Miller et al. |
| 2006/0067069 A1 | 3/2006 | Heard et al. |
| 2006/0085573 A1 | 4/2006 | Pike et al. |
| 2006/0087813 A1 | 4/2006 | Becker et al. |
| 2006/0087814 A1 | 4/2006 | Brandon et al. |
| 2006/0146461 A1 | 7/2006 | Jones et al. |
| 2006/0195644 A1 | 8/2006 | Arndt et al. |
| 2006/0230208 A1 | 10/2006 | Gregg et al. |
| 2006/0253619 A1 | 11/2006 | Torudbakken et al. |
| 2006/0288130 A1 | 12/2006 | Madukkarumukumana et al. |
| 2007/0008663 A1 | 1/2007 | Nakashima et al. |
| 2007/0069585 A1 | 3/2007 | Bosco et al. |
| 2007/0073955 A1 | 3/2007 | Murray et al. |
| 2007/0115230 A1 | 5/2007 | Tajiri et al. |
| 2007/0136554 A1 | 6/2007 | Biran et al. |
| 2007/0168636 A1 | 7/2007 | Hummel et al. |
| 2007/0183393 A1 | 8/2007 | Body et al. |
| 2007/0186074 A1 | 8/2007 | Bradford et al. |
| 2007/0211430 A1 | 9/2007 | Bechtolsheim |
| 2007/0226386 A1 | 9/2007 | Sharp et al. |
| 2007/0234018 A1 | 10/2007 | Feiste |
| 2007/0239925 A1 | 10/2007 | Koishi |
| 2007/0245041 A1 | 10/2007 | Hua et al. |
| 2007/0262891 A1 | 11/2007 | Woodral et al. |
| 2007/0271559 A1 | 11/2007 | Easton et al. |
| 2007/0274039 A1 | 11/2007 | Hamlin |
| 2008/0043405 A1 | 2/2008 | Lee et al. |
| 2008/0065796 A1 | 3/2008 | Lee et al. |
| 2008/0069141 A1 | 3/2008 | Bonaguro et al. |

(56) References Cited

U.S. PATENT DOCUMENTS

| | | | |
|---|---|---|---|
| 2008/0077817 A1 | 3/2008 | Brundridge et al. |
| 2008/0091915 A1 | 4/2008 | Moertl et al. |
| 2008/0114906 A1 | 5/2008 | Hummel et al. |
| 2008/0126648 A1 | 5/2008 | Brownlow et al. |
| 2008/0126652 A1 | 5/2008 | Vembu et al. |
| 2008/0148295 A1 | 6/2008 | Freimuth et al. |
| 2008/0162865 A1 | 7/2008 | Koufaty et al. |
| 2008/0168208 A1 | 7/2008 | Gregg |
| 2008/0189577 A1 | 8/2008 | Arndt et al. |
| 2008/0192431 A1 | 8/2008 | Bechtolsheim |
| 2008/0209114 A1 | 8/2008 | Chow et al. |
| 2008/0222406 A1 | 9/2008 | Tabuchi |
| 2008/0235425 A1 | 9/2008 | Belmar et al. |
| 2008/0239687 A1 | 10/2008 | Leigh et al. |
| 2008/0239945 A1 | 10/2008 | Gregg |
| 2008/0259555 A1 | 10/2008 | Bechtolsheim et al. |
| 2008/0270853 A1 | 10/2008 | Chagoly et al. |
| 2009/0037682 A1 | 2/2009 | Armstrong et al. |
| 2009/0070760 A1 | 3/2009 | Khatri et al. |
| 2009/0125666 A1 | 5/2009 | Freking et al. |
| 2009/0144462 A1 | 6/2009 | Arndt et al. |
| 2009/0144731 A1 | 6/2009 | Brown et al. |
| 2009/0182966 A1 | 7/2009 | Greiner et al. |
| 2009/0182969 A1 | 7/2009 | Norgaard et al. |
| 2009/0210646 A1 | 8/2009 | Bauman et al. |
| 2009/0222814 A1 | 9/2009 | Astrand |
| 2009/0234987 A1 | 9/2009 | Lee et al. |
| 2009/0240849 A1 | 9/2009 | Corneli et al. |
| 2009/0249039 A1 | 10/2009 | Hook et al. |
| 2009/0276551 A1 | 11/2009 | Brown et al. |
| 2009/0276773 A1 | 11/2009 | Brown et al. |
| 2009/0276774 A1 | 11/2009 | Kinoshita |
| 2009/0328035 A1 | 12/2009 | Ganguly |
| 2010/0005234 A1 | 1/2010 | Ganga et al. |
| 2010/0005531 A1 | 1/2010 | Largman et al. |
| 2010/0027559 A1 | 2/2010 | Lin et al. |
| 2010/0042999 A1 | 2/2010 | Dorai et al. |
| 2010/0169674 A1 | 7/2010 | Kazama et al. |
| 2010/0205608 A1 | 8/2010 | Nemirovsky et al. |
| 2010/0287209 A1 | 11/2010 | Hauser |
| 2011/0029696 A1 | 2/2011 | Uehara |
| 2011/0029734 A1 | 2/2011 | Pope et al. |
| 2011/0131359 A1 | 6/2011 | Pettey et al. |
| 2011/0219161 A1 | 9/2011 | Deshpande et al. |
| 2011/0258352 A1 | 10/2011 | Williams et al. |
| 2011/0265134 A1 | 10/2011 | Jaggi et al. |
| 2011/0317351 A1 | 12/2011 | Pizzolato et al. |
| 2011/0317743 A1 | 12/2011 | DeCusatis et al. |
| 2011/0320602 A1 | 12/2011 | Carlson et al. |
| 2011/0320666 A1 | 12/2011 | Gregg et al. |
| 2011/0320674 A1 | 12/2011 | Gregg et al. |
| 2011/0320703 A1 | 12/2011 | Craddock et al. |
| 2011/0320796 A1 | 12/2011 | DeCusatis et al. |
| 2011/0320861 A1 | 12/2011 | Bayer et al. |
| 2011/0320887 A1 | 12/2011 | Craddock et al. |
| 2011/0320892 A1 | 12/2011 | Check et al. |

FOREIGN PATENT DOCUMENTS

| | | |
|---|---|---|
| CN | 101571631 A | 11/2009 |
| CN | 102193239 A | 9/2011 |
| JP | 57191826 | 11/1982 |
| JP | 5981724 | 5/1984 |
| JP | 6279557 | 4/1987 |
| JP | 0553973 | 3/1993 |
| JP | 2007087082 A | 4/2007 |
| JP | 2007241526 A | 9/2007 |
| JP | 2010134627 A | 6/2010 |
| WO | WO9600940 | 11/1996 |
| WO | 2009027189 A1 | 3/2009 |

OTHER PUBLICATIONS

J. Regula, "Using Non-transparent Bridging in PCI Express Systems", PLX Technology, Inc., pp. 1-31, Jun. 1, 2004.
Jack Regula; "Ethernet Tunneling through PCI Express Inter-Processor Communication, Low Latency Storage IO Source"; www.wwpi.com; publisher: Computer Technology Review; Jan. 19, 2009.
Robert F. Kern, "IBM System z & DS8000 Technology Synergy", IBM ATS Americas Disk Storage; Jul. 21, 2009, pp. 1-25.
Szwed et al.; "Managing Connected PCI Express Root Complexes"; Dated: Dec. 23, 2009—6 pages.
Final Office Action mail date Jun. 15, 2011 for U.S. Appl. No. 12/821,221.
U.S. Appl. No. 12/821,124, filed Jun. 23, 2010.
U.S. Appl. No. 12/821,181, filed Jun. 23, 2010.
U.S. Appl. No. 12/821,182, filed Jun. 23, 2010.
U.S. Appl. No. 12/821,185, filed Jun. 23, 2010.
U.S. Appl. No. 12/821,191, filed Jun. 23, 2010.
U.S. Appl. No. 12/821,648, filed Jun. 23, 2010.
Z/Architecture Principles of Operation, Feb. 2009; pp. 1-1344, IBM Corporation.
Huang, Wei et al., "A Case for High Performance Computing with Virtual Machines," ISC '06, Jun. 3 28 30, Carins, Queensland, Australia, pp. 125-134, Jun. 3, 2006.
Swift, Micael M. et al., "Improving the Reliability of Commodity Operating Systems," ACM Transactions on Computer Systems, vol. 23, No. 1, Feb. 2005, pp. 77-110.
Non-final office Action received for U.S. Appl. No. 12/821,239 dated Nov. 8, 2012.
Non-final Office Action dated Sep. 26, 2012 for U.S. Appl. No. 12/821,243.
Final Office Action dated Sep. 13, 2012 for U.S. Appl. No. 12/821,256.
Final Office Action received Oct. 10, 2012 for U.S. Appl. No. 12/821,221.
Non-final Office Action received Oct. 11, 2012 for U.S. Appl. No. 12/821,247.
Notice of Allowance dated Sep. 19, 2012 for U.S. Appl. No. 12/821,224.
U.S. Appl. No. 12/821,221, filed Jun. 23, 2010.
U.S. Appl. No. 12/821,222, filed Jun. 23, 2010.
U.S. Appl. No. 12/821,224, filed Jun. 23, 2010.
U.S. Appl. No. 12/821,226, filed Jun. 23, 2010.
U.S. Appl. No. 12/821,239, filed Jun. 23, 2010.
U.S. Appl. No. 12/821,242, filed Jun. 23, 2010.
U.S. Appl. No. 12/821,243, filed Jun. 23, 2010.
U.S. Appl. No. 12/821,245, filed Jun. 23, 2010.
U.S. Appl. No. 12/821,247, filed Jun. 23, 2010.
U.S. Appl. No. 12/821,250, filed Jun. 23, 2010.
U.S. Appl. No. 12/821,256, filed Jun. 23, 2010.
U.S. Appl. No. 12/821,271, filed Jun. 23, 2010.
Baumann, Andrew, et al., "The Multikernel: A New OS Architecture for Scalable Multicore Systems," Oct. 2009, SOSP'09, Oct. 11-14, 2009, Big Sky, Montana, USA, pp. 29-43.
Crawford et al. "Accelerating Computing with the Cell Broadband Engine Processor"; CF'08, May 5-7, 2008; Ischia, Italy; Copyright 2008 ACM 978-1-60558-077.
Darren Abramson et al.; "Intel Virtualization Technology for Directed I/O"; Intel Technology Journal, vol. 10, Issue 3, Aug. 10, 2006; pp. 1-16.
Huang, Wei et al., "A Case for High Performance Computing with Virtual Machines," ISC '06, Jun3 28 30, Carins, Queensland, Australia, pp. 125-134, Jun. 3, 2006.
"Intel (registered trademark) Itanium (registered trademark) Architecture Software Developer's Manual," vol. 2, Rev. 2.2, Jan. 2006.
"z/VM: General Information Manual," IBM Publication No. GC24-5991-05, May 2003.
"DMA Engines Bring Mulicast to PCI Express Systems," http://electronicdesign.com, Aug. 13, 2009, 3 pages.
"I/O Virtualization and AMD's IOMMU," AMD Developer Central, http://developer.amd.com/documentation/articles/pages.892006101.aspx, Aug. 9, 2006.
"IBM Enhances the IBM eServer zSeries 990 Family of Servers," Hardware Announcement, Oct. 7, 2003, pp. 1-11.
Internet Article, "Large Page Support in the Lunux Kernel," http://lwn.net./Articles/69691<retrieved on Jan. 26, 2010>.
K. Vaidyanathan et al.; "Exploiting RDMA Operations for Providing Efficient Fine-Grained Resource Monitoring in Cluster-Based Servers"; Jun. 2006; pp. -10; Downloaded: Apr. 13, 2010 at 18:53:46 UTC from IEEE Xplore. 1-4244-0328-6/06.

(56) References Cited

OTHER PUBLICATIONS

Mysore, Shashidhar et al., "Understanding and Visualizing Full Systems with Data Flow Tomography" SPOLOS '08, Mar. 1-5, 2008, Seattle, Washington, USA, pp. 211-221.
Narayanan Ganapathy et al.; Papers-USENIX Annual Teleconference (No. 98); Entitled: "General Purpose Operating System Support for Multiple Page Sizes" 1998; pp. 1-9.
Non-Final Office Action mail date Jan. 10, 2011.
Paulsen, Erik; "Local Memory Coaxes Top Speed from SCSI Masters"; Electronic Design, v. 41, (Apr. 15, 1993) p. 75-6+.
Swift, Micael M. et al., "Improving the Reliability of Commodity Operating Systems, " ACM Transactions on Computer Systems, vol. 23, No. 1, Feb. 2005, pp. 77-110.
Talluri et al., "A New Page Table for 64-bit Address Spaces," ACM SIGOPS Operating Systems Review, vol. 29, Issue 5 (Dec. 1995), pp. 194-200.
VTdHowTo—Xen Wiki; Downloaded—Apr. 16, 2010; pp. 1-5; http://wiki.xensource.com/xenwiki/VTdHowTo.
Winwood, Simon, et al., "Multiple Page Size Support in the Linux Kernel", Proceedings of Ottawa Linux Symposium, 2002.
Xu, Min et al., "Towards a VMM-based Usage Control Framework for OS Kernel Integrity Protection," SACMAT '07, Jun. 20-22, 2007, Sophia Antipolis, France, pp. 71-80.
z/VM: Running Guest Operating Systems, IBM Publication No. SC24-5997-02, Oct. 2001.
International Search Report, PCT/CN2013/070828, mailed Apr. 25, 2013, 13 pages.
ISR, Information Materials for IDS, dated Apr. 8, 2013, from JPO OA dated Mar. 26, 2013, 2 pages.

| PCHID | DEVICE TYPE | LOGICAL PARTITION AUTHORIZATION | SPECIAL DESIGNATION |
|---|---|---|---|
| 1 (HUB) | PCIe FUNCTION | | WRAP MODE |
| 2 (I/O DEVICE) | | | |
| 3 (HUB) | PCIe FUNCTION | | WRAP MODE |
| ... | ... | ... | ... |

CONNECTED INPUT/OUTPUT HUB MANAGEMENT

BACKGROUND

This invention relates generally to input/output (I/O) hub interfacing within a computing environment, and more particularly to connected I/O hub management.

During the manufacture of systems comprised of multiple frames or subsystems (e.g., central electronics complex (CEC) and input/output (I/O) frames), it is beneficial to be able to test the functionality and external connectivity of the system's main computing subsystem (e.g., CEC frame) in a stand-alone configuration without being connected to other subsystems (e.g., I/O frames). Advantages of a stand-alone test include reduced hardware cost and, with less components involved, improved fault isolation.

Most of the capabilities of a CEC frame (e.g., CPU, memory, and nest capabilities) can be tested in a stand-alone configuration, but much of the functionality in the I/O hub chip (which is also a part of the CEC frame) requires capabilities typically provided only by components in an I/O frame or subsystem. A nest component of a CEC frame includes various chips, such as system control chips, cache chips, and memory storage controller chips.

One comprehensive solution for testing the I/O hub of a CEC frame is to abandon the philosophy of a stand-alone configuration and attach an I/O frame; however, this is also the most expensive solution. Many early-life failures of I/O related components in a CEC frame can be exposed without requiring the functionality of a full I/O frame. Also, the increased number of components involved in the system test reduces the isolation capabilities of I/O-hub focused tests.

Another solution is the connection of special test vehicles to the CEC frame I/O ports. These units are typically much less expensive than a full I/O frame and are designed to provide specific test functionality. This can be an effective method for testing I/O functionality of a CEC during (semi) stand-alone testing. However, similar drawbacks as those described above regarding a full I/O frame connection also apply to using a test vehicle; that is, there is expense in acquiring and potentially developing these test vehicles. Also, when attempting to isolate a fault, the test vehicles themselves need to be considered as a possible source of failures.

SUMMARY

An exemplary embodiment includes a method for implementing connected input/output (I/O) hub configuration and management. The method includes configuring a first I/O hub in wrap mode with a second I/O hub. The first and second I/O hubs are communicatively coupled to one another via a wrap cable. The method also includes generating data traffic on a main computing subsystem that includes the first and second I/O hubs. Generating the data traffic includes: converting, by the first I/O hub, a request to implement a transaction to an I/O device-readable request packet and transmitting the I/O device-readable request packet over the wrap cable; converting, by the second I/O hub, the I/O device-readable request packet into a system readable request and transmitting the system readable request over a system bus, the system readable request addressed to a system memory; receiving, by the second I/O hub, a response to the system readable request from the system memory, converting the response to an I/O device-readable response packet, and transmitting the I/O device-readable response packet over the wrap cable; and converting, by the first I/O hub, the I/O device-readable response packet into a system readable response packet, and transmitting the system readable response packet over the system bus to a processor that initiated the request to implement a transaction.

A further exemplary embodiment includes a system for implementing connected input/output (I/O) hub configuration and management. The system includes a first I/O hub, a second I/O hub communicatively coupled to the first I/O hub via a wrap cable, and a processor in communication with the first and second I/O hubs. The processor and the first and second I/O hubs implement a method. The method includes configuring the first I/O hub in wrap mode with the second I/O hub, and generating data traffic on a main computing subsystem that includes the processor and the first and second I/O hubs. Generating the data traffic includes: converting, by the first I/O hub, a request to implement a transaction to an I/O device-readable request packet and transmitting the I/O device-readable request packet over the wrap cable; converting, by the second I/O hub, the I/O device-readable request packet into a system readable request and transmitting the system readable request over a system bus, the system readable request addressed to a system memory of the main computing subsystem; receiving, by the second I/O hub, a response to the system readable request from the system memory, converting the response to an I/O device-readable response packet, and transmitting the I/O device-readable response packet over the wrap cable; and converting, by the first I/O hub, the I/O device-readable response packet into a system readable response packet, and transmitting the system readable response packet over the system bus to a processor that initiated the request to implement a transaction.

An additional exemplary embodiment includes a computer program product for implementing connected input/output (I/O) hub configuration and management. The computer program product includes a non-transitory storage medium readable by a processing circuit and storing instructions for execution by the processing circuit for performing a method. The method includes configuring a first I/O hub in wrap mode with a second I/O hub. The first and second I/O hubs are communicatively coupled to one another via a wrap cable. The method also includes generating data traffic on a main computing subsystem that includes the first and second I/O hubs. Generating the data traffic includes: converting, via the first I/O hub, a request to implement a transaction to an I/O device-readable request packet and transmitting the I/O device-readable request packet over the wrap cable; converting, via the second I/O hub, the I/O device-readable request packet into a system readable request and transmitting the system readable request over a system bus, the system readable request addressed to a system memory; in response to receiving, at the second I/O hub, a response to the system readable request from the system memory, converting, via the second I/O hub, the response to an I/O device-readable response packet, and transmitting the I/O device-readable response packet over the wrap cable; and converting, via the first I/O hub, the I/O device-readable response packet into a system readable response packet, and transmitting the system readable response packet over the system bus to a processor that initiated the request to implement a transaction.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Exemplary embodiments of the present invention provide a means for controlling I/O hub ports such that when they are cabled together (e.g., using a wrap plug and/or wrap cable), a program may easily generate high-level transport layer traffic on the I/O hub ports' cabling, thereby providing the ability to perform I/O functionality testing without the need for an I/O frame interconnect. This transport layer traffic tests a broad scope of functionality within I/O hub chips and, as an additional benefit, provides a means of communication between logical partitions. A wrap plug connects a given port's outputs and inputs together, and a wrap cable connects the inputs and outputs of separate ports together.

In an exemplary embodiment, an I/O hub is configured to enable outgoing packets to be interpreted as incoming packets. Thus, when I/O ports of an I/O hub-enabled subsystem (e.g., CEC frame) are connected using a wrap plug or wrap cable, a broad scope of I/O functionality can be tested during a CEC stand-alone test. Using this wrap capability during manufacturing testing eliminates the cost of the required test fixtures (i.e., a test I/O frame or test vehicles) and minimizes the number of sources for a failure, thus improving fault isolation.

In an exemplary embodiment, a system is configured with wrap cables on the downbound (i.e., endpoint-connected) ports of an I/O switch as part of the I/O frame manufacturing test. It may also be applied out in the field to assist with problem diagnostics and fault isolation for the subsystems (e.g., CEC frame and I/O frame).

Additionally, the exemplary embodiments provide a low-overhead method for using a communication link established over the wrap cable as a channel between logical partitions of a system.

Figure 1:
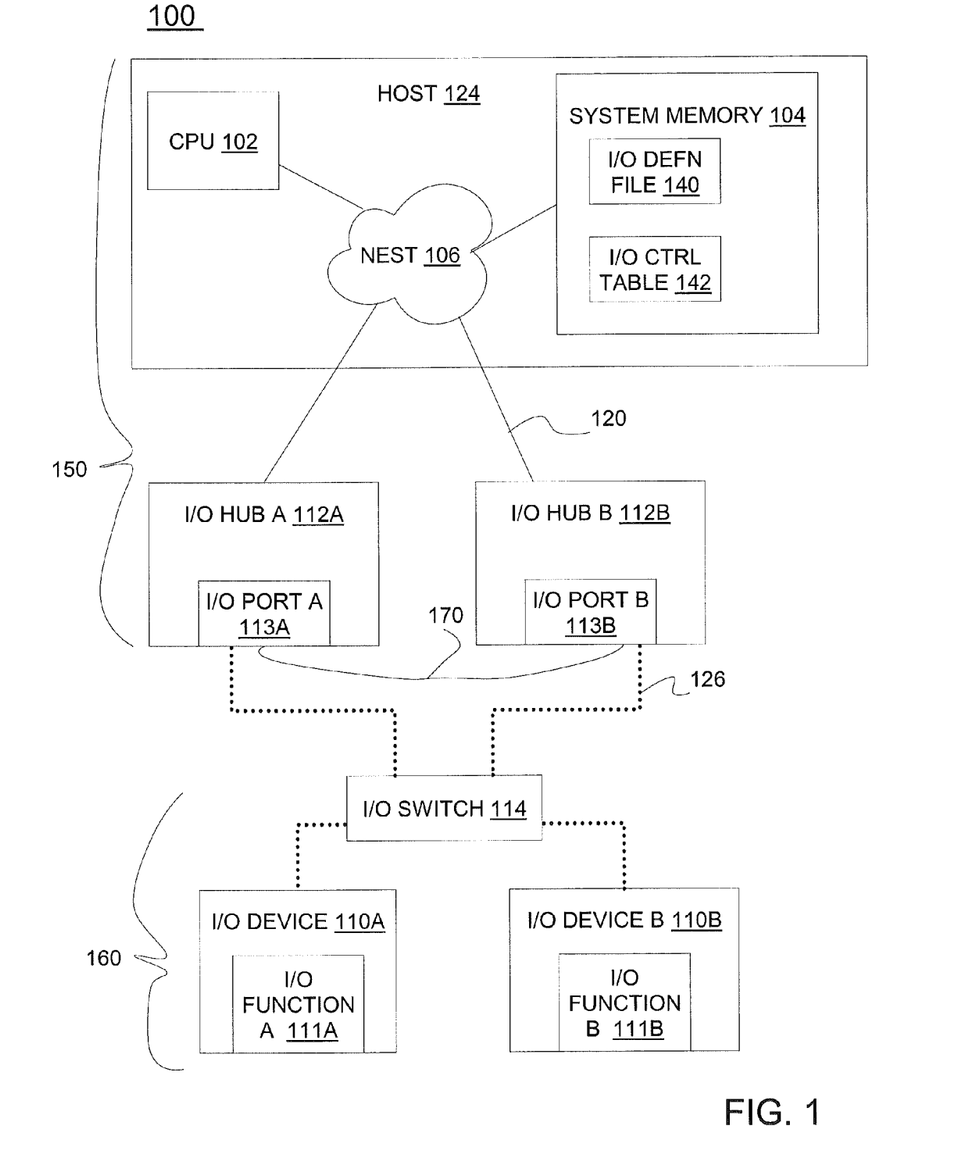
FIG. 1 depicts a block diagram of a computer system that may be implemented in an exemplary embodiment.

Turning now to FIG. 1, a computer system 100 that may be implemented by an exemplary embodiment of the present invention will now be described. In an embodiment, the computer system 100 is a System z® server offered by International Business Machines Corporation (IBM®). System z is based on the z/Architecture® offered by IBM. Details regarding the z/Architecture are described in an IBM publication entitled, "z/Architecture Principles of Operation," IBM Publication No. SA22-7832-07, February 2009, which is hereby incorporated herein by reference in its entirety.

In many I/O subsystem infrastructures, one or more I/O hubs interface between a system memory nest and an I/O interconnection network (e.g., I/O frame). For large systems, the I/O infrastructure might be split across one or more frames physically separate from a main computing subsystem (e.g., CEC frame), connected via high-speed cabling.

As described in an exemplary embodiment herein, I/O hub port controls and testing processes are implemented using Peripheral Component Interconnect Express (PCIe) protocols. PCIe is a component level interconnect standard that defines a bi-directional communication protocol for transactions between I/O adapters and host systems. PCIe communications are encapsulated in packets according to the PCIe standard for transmission on a PCIe bus. Transactions originating at I/O adapters and ending at host systems are referred to as upbound transactions. Transactions originating at host systems and terminating at I/O adapters are referred to as downbound transactions. The PCIe topology is based on point-to-point unidirectional links that are paired (e.g., one upbound link, one downbound link) to form the PCIe bus. The PCIe standard is maintained and published by the Peripheral Component Interconnect Special Interest Group (PCI-SIG).

In an exemplary embodiment, computer system 100 includes one or more central processing units (CPUs) 102 coupled to a system memory 104 via nest 106. The nest 106 may include elements such as a memory controller, cache chips, and system controller, to name a few. The system memory 104, CPU(s) 102 and nest 106 collectively form a host 124, as depicted in FIG. 1.

In an embodiment, a host bus 120 connects one or more I/O hubs (e.g., I/O hubs 112A and 112B) to the nest 106. The host 124, host bus 120 and I/O hubs 112A/112B collectively form a main computing subsystem 150 of the computer system 100. In the System z architecture, this subsystem 150 is referred to as a central electronics complex (CEC).

As shown in FIG. 1, the computer system 100 may be developed for implementation with an I/O infrastructure (shown in FIG. 1 as I/O subsystem or frame 160). The subsystem 150 communicates with the I/O subsystem 160 over I/O communication connections (or I/O bus) 126. The I/O subsystem 160 may include one or more I/O switches 114 that direct communications (data traffic) between I/O devices (e.g., I/O devices 110A and 110B) and I/O hubs 112A and 112B.

When the subsystem 150 is operably coupled to the I/O subsystem 160, a variety of transactions may be generated and executed among the subsystems 150 and 160. For example, system memory 104 may be accessed when a CPU 102, or an I/O device 110A/110B issues a memory request (read or write) that includes an address used to access the system memory 104. The address included in the memory request is typically not directly usable to access system memory 104, and therefore, it requires translation to an address that is directly usable in accessing system memory 104. In an embodiment, the address is translated via an address translation mechanism (ATM), which may be implemented via the CPU 102 (not shown). In an embodiment, the ATM translates the address from a virtual address to a real or absolute address using, for example, dynamic address translation (DAT). The memory request, including the translated address, is received by the nest 106. In an embodiment, the nest 106 maintains consistency in the system memory 104 and arbitrates between requests for access to the system memory 104 from hardware and software components including, but not limited to, the CPUs 102 and the I/O devices 110A/110B.

When the subsystem 150 is operably coupled to the subsystem 160, the I/O devices 110A/110B perform one or more I/O functions (e.g., functions 111A/111B). A memory request that is sent from one of the CPUs 102 the to the I/O devices 110A/110B (i.e., a downbound memory request) is first routed to an I/O hub (e.g., one of hubs 112A/112B), which is connected to an I/O bus 126. The memory request is then sent from the I/O bus 126 to one of the I/O devices 110A/110B via one or more I/O switches 114. The I/O bus 126 and I/O switches 114 may communicate in a standard PCIe format as is known in the art.

In an exemplary embodiment, the nest 106 includes one or more state machines, or logic (not shown) for interpreting and transmitting I/O operations, bi-directionally, between the host system 124 and the I/O devices 110A and 110B. The I/O hubs 112A and 112B may also include a root complex (not shown) that receives requests and completions from one of the I/O switches 114 (e.g., when not in wrap mode). Memory requests include an I/O address that may need to be translated, and thus, the I/O hub 112A/112B provides the address to an address translation and protection (ATP) unit (not shown). The ATP unit may be used to translate, if needed, the I/O address into to an address directly usable to access system memory 104.

In an exemplary embodiment, the subsystem 150 is not communicatively coupled to the I/O subsystem 160, as shown by the dotted lines representing the I/O bus 126. Rather, a wrap cable 170 is connected to I/O ports 113A and 113B of respective I/O hubs 112A and 112B. In an alternative exemplary embodiment, a wrap plug (not shown) may be coupled to two ports of a single I/O hub.

As shown in FIG. 1, an I/O definition file 140 is stored in system memory 104, along with an I/O control table 142. The I/O definition file 140 contains information about the I/O configuration of the subsystem, such as operating system data, switch data, device data, processor data, channel path data, control unit data, channel subsystem data, and logical partitions. The I/O definition file 140 may be configured by a user of the computer system 100 using appropriate operating system tools. For example, in the system Z architecture, I/O definitions may be user-configured via Hardware Configuration Definition (HCD). A user of the computer system 100 may configure one or more I/O hubs 112A and 112B in wrap mode via the I/O definition file 140, such that the system operating system will not attempt to discover the I/O topology of I/O devices associated with the I/O hub during system start up. The I/O definition file 140 is described further in FIG. 3.

Figure 2:
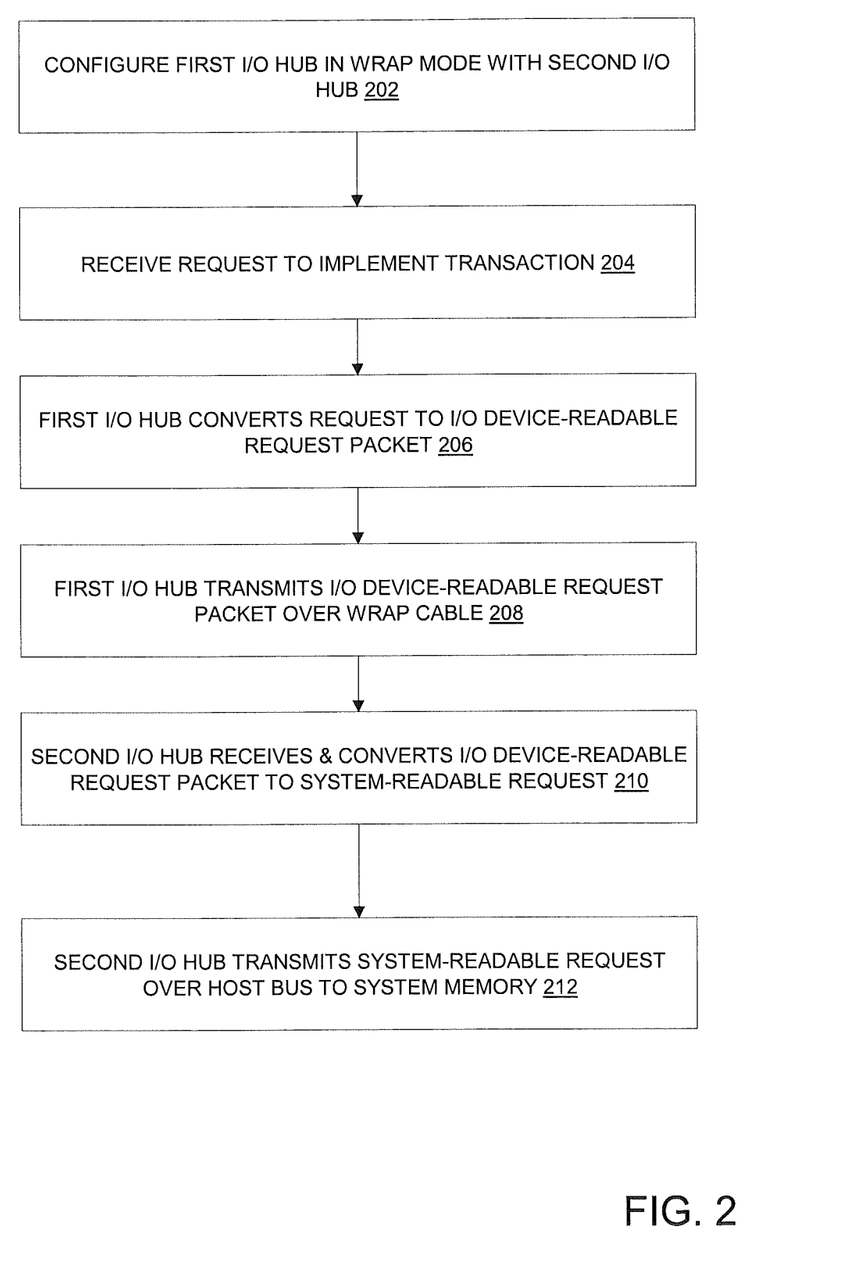
FIG. 2 is a flow diagram describing a process for configuring and testing I/O functionality of an I/O hub-enabled subsystem in an exemplary embodiment.

Turning now to FIG. 2, a flow diagram describing a process for configuring and testing I/O functionality of an I/O hub-enabled subsystem 150 will now be described in an exemplary embodiment.

Between connected I/O hubs (root complexes), the port 113 behavior is nearly the same as that of an I/O endpoint connected to a root complex. However, the root complex processes incoming packets slightly different than an I/O endpoint; a valid root complex design has the root complex rejecting incoming configuration request packets as unsupported requests. Because of this special behavior, the traffic transmitted from a root complex, while it is connected to another root, needs to be controlled. In the following description, when a root complex or I/O hub is connected to another root complex (I/O hub), it is said to be in wrap mode.

An established method of discovering the I/O subsystem 160 topology connected to an I/O hub root complex is to perform a "bus-walk" procedure, issuing configuration-request probe packets out of the root complex. However, when the root complex is in wrap mode, issuing configuration requests will result in a response (from the connected root complex) of "unsupported request." In an exemplary embodiment, an I/O hub (e.g., I/O hub 112A/112B) is explicitly designated in step 202 of FIG. 2 as being in wrap mode in the user-constructed I/O definition file 140 (see FIG. 3). With this designation, the system firmware will not attempt to discover the I/O topology attached to the root complex.

Figure 3:
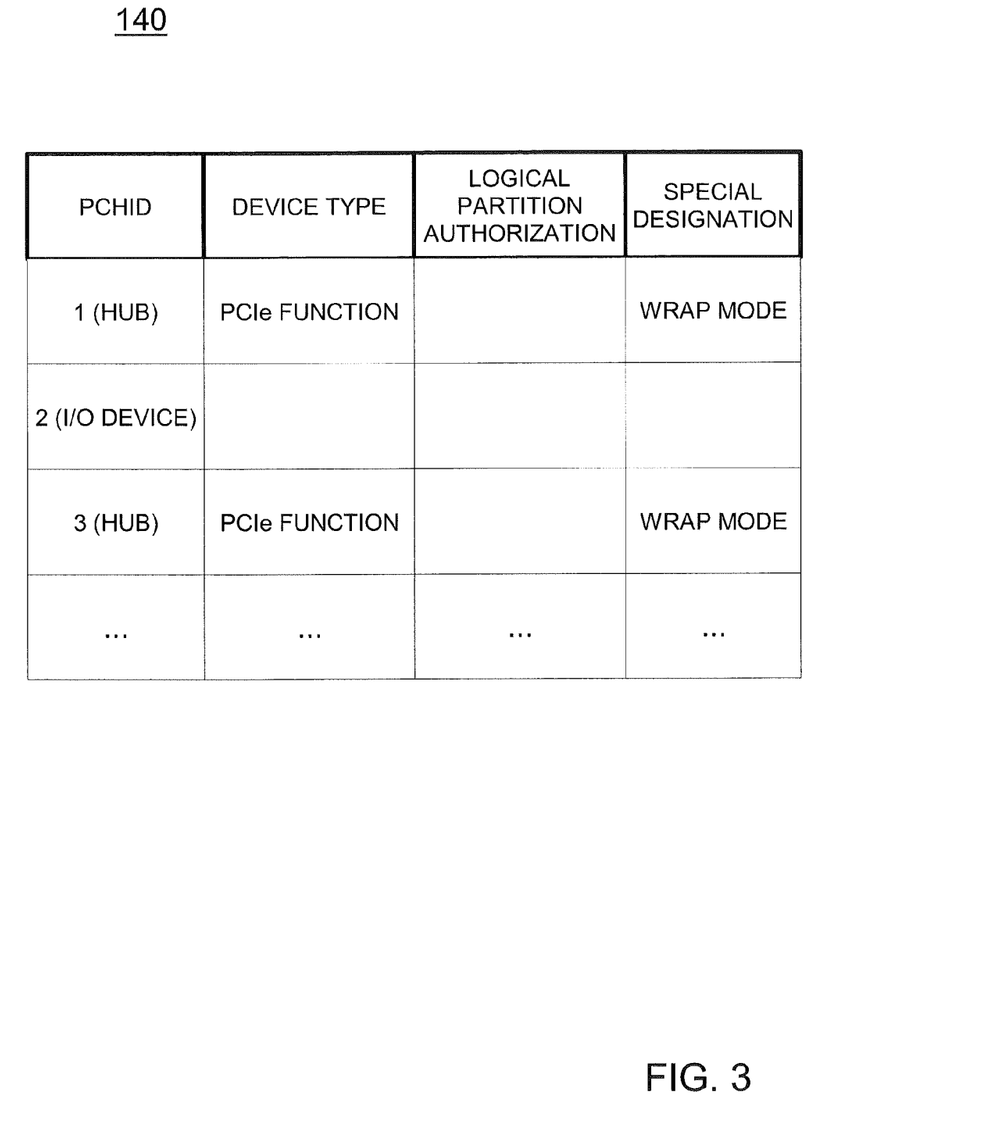
FIG. 3 depicts an I/O definition file in an exemplary embodiment.

Each I/O device slot in a system frame corresponds to a physical channel ID (PCHID) and, ordinarily, an I/O definition file only describes the contents or planned contents of PCHIDs in the I/O frame and specifies the logical partitions authorized to use the corresponding I/O device. In the case of an I/O hub in wrap mode, in an exemplary embodiment, the PCHID in the subsystem 150 of a slot containing the corresponding I/O hub device is specified in the I/O definition file 140 as a root complex in wrap mode. As shown in FIG. 3, each entry in the file 140 corresponds to a PCHID value (a physical slot location for an I/O device or I/O hub card). In each entry is a designation of the device type and the logical partition authorization. The PCHID values corresponding to the I/O hubs having the wrap cable 170 (e.g., I/O hubs 112A and 112B) have a device type of "PCIe function" and a special designation that they are "wrap mode" functions.

During system start up or initial machine load (IML), the system firmware parses the I/O definition file 140 and builds an internal I/O control table 142. The I/O control table 142 contains information such as, but not limited to, device type, routing path, and logical partition authorizations. In a PCIe-implemented embodiment, each entry in this table 142 corresponds to a PCIe function (e.g., I/O function 111A/111B). Also, each I/O hub 112A/112B (root complex) in wrap mode is represented in this table 142 as an I/O function with a special wrap-mode designation. After parsing the I/O definition file 140, the system firmware discovers the physical topology attached to each of the no-wrap-mode I/O hubs 112A/112B (root complexes), e.g., using a bus-walk procedure and further refines the internal I/O control tables 142.

Because the wrap-mode I/O hubs 112A/112B are internally represented as I/O functions 111A/111B, respectively, programs are able to generate traffic over the wrap cable 170 using methods similar to those used to communicate with an I/O endpoint.

After system boot, or IML, the program discovers and enables the two wrap-mode functions: A and B. An exemplary implementation of function discovery, designation and enablement is described in U.S. patent application Ser. Nos. 12/821,184 and 12/821,185, filed concurrently with the instant application and which are incorporated by reference herein in their entireties. Enablement may include registering functions A and B with Address Translation and Protection (ATP) facility in the I/O hubs 112A and 112B respectively. In step 204, a request to implement a transaction is received at an I/O hub targeted for receiving the request. For example, assuming the request is targeted to function handle A (i.e., function 111A), the CPU 102 interprets the request and forwards it to the nest 106, targeting the I/O hub (I/O hub 112A) corresponding to function A 111A. The targeted I/O hub 112A receives the request to implement the transaction and, at step 206, converts the request into an I/O device-readable request packet (e.g., a PCIe request packet).

At step 208, the I/O hub 112A transmits the I/O device-readable request over the wrap cable 170 via port 113A and the request is received by the I/O hub 112B via the port 113B. At step 210, the second I/O hub 112B converts the I/O device-readable request into a system-readable request (e.g., readable by the system memory 104), possibly using the ATP capabilities registered for function B during function enablement. The second I/O hub 112B transmits the system-readable request over the host bus 120 to the nest 106 at step 212 for execution.

Depending upon the type of transaction request implemented, the processes described above in FIG. 2 may be adjusted to accommodate requirements imposed by the specified transaction. For example, if the transaction request is a LOAD-REQUEST-RESPONSE, the CPU 102 interpretation step described above may involve interpreting the LOAD-type instruction and issuing a system memory load request into the nest 106. In addition, the converting step 206 may include converting the system memory load request into an I/O memory read request packet. Also, the converting performed in step 210 may include converting the I/O memory read request packet into a system memory load request. Once the system memory 104 has executed the request in response to step 212, the system memory 104 generates a system memory load response, targeting the I/O hub associated with function B 111B (i.e., I/O hub 112B). The I/O hub 112B receives the system memory load response, converts it into an I/O device memory read response packet and transmits it on the wrap cable 170. I/O hub 112A receives the response packet, converts it into a system memory response packet and submits it into the nest 106, targeting the CPU 102 that issued the original request. The CPU 102 completes the execution of the LOAD instruction by providing to the program, the response data returned in the response packet.

Traffic comprised of store-requests is generated in a similar manner as above, initiated by the program issuing a STORE-type instruction. Also, simultaneously symmetric wrap-cable traffic can be generated: LOAD- and STORE-type instructions can be targeted to function B.

In addition to converting PCIe memory transactions into system memory transactions, the I/O hub (root complex) is responsible for converting I/O message signaled interrupt (MSI) packets into system interrupts. MSI messages provide a means for logically generating an interrupt as an alternative to pin-based interrupts. A PCIe MSI is represented by a PCIe memory write operation by a function to a specially registered address range. To create a PCIe-sourced system interrupt using our invention, the program simply issues a STORE-type instruction to the special MSI address range, targeting a wrap-mode function.

As indicated above, the exemplary embodiments provide a convenient and effective means for a program to generate PCIe endpoint-like traffic out of and into a root complex using system memory requests. The load/store traffic generated on the wrap cable exercises most of the corresponding packet processing logic in the I/O hub. That processing includes, but is not limited to, address translation, DMA traffic measurement, and error handling. The I/O hub portion of a CEC frame and the corresponding system firmware can be put through a thorough test without attaching anything more than wrap cables to the I/O ports.

In addition, exemplary embodiments provide a method of low-latency, high-bandwidth communication between logical partitions. Each wrap-mode root complex functions as a gateway into a partition's memory space, and can control the incoming traffic from a wrap-mode function in the same way that it controls and filters incoming traffic from a standard PCIe endpoint function. For example, the I/O definition file may assign ownership of function A to partition 1 and ownership of function B to partition 2. Each partition registers its function with the ATP facility of the corresponding I/O hub, putting in place the appropriate filters with regard to valid destination addresses for incoming packets. A communication channel between the partitions is established because partition 1 is able to access a portion of partition 2's memory space through function A, and partition 2 is able to access a portion of partition 1's memory space through function B.

One or more of the above-referenced components and/or functionalities may be implemented via, e.g., the systems and processes described in U.S. patent application Ser. No. 12/821,181; U.S. patent application Ser. No. 12/821,182; U.S. patent application Ser. No. 12/821,191; and U.S. patent application Ser. No. 12/821,194, each of which is filed concurrently with the instant application and each of which are incorporated by reference herein in its entirety.

Technical effects and benefits include an effective means for a program to generate I/O endpoint-like traffic into an I/O hub using system memory requests. The load/store traffic that can be generated on a wrap cable can exercise most of the corresponding packet processing logic in the I/O hub. The I/O hub portion of a main computing subsystem and the corresponding system firmware can be put through a thorough test without attaching anything more than wrap cables to the I/O ports.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
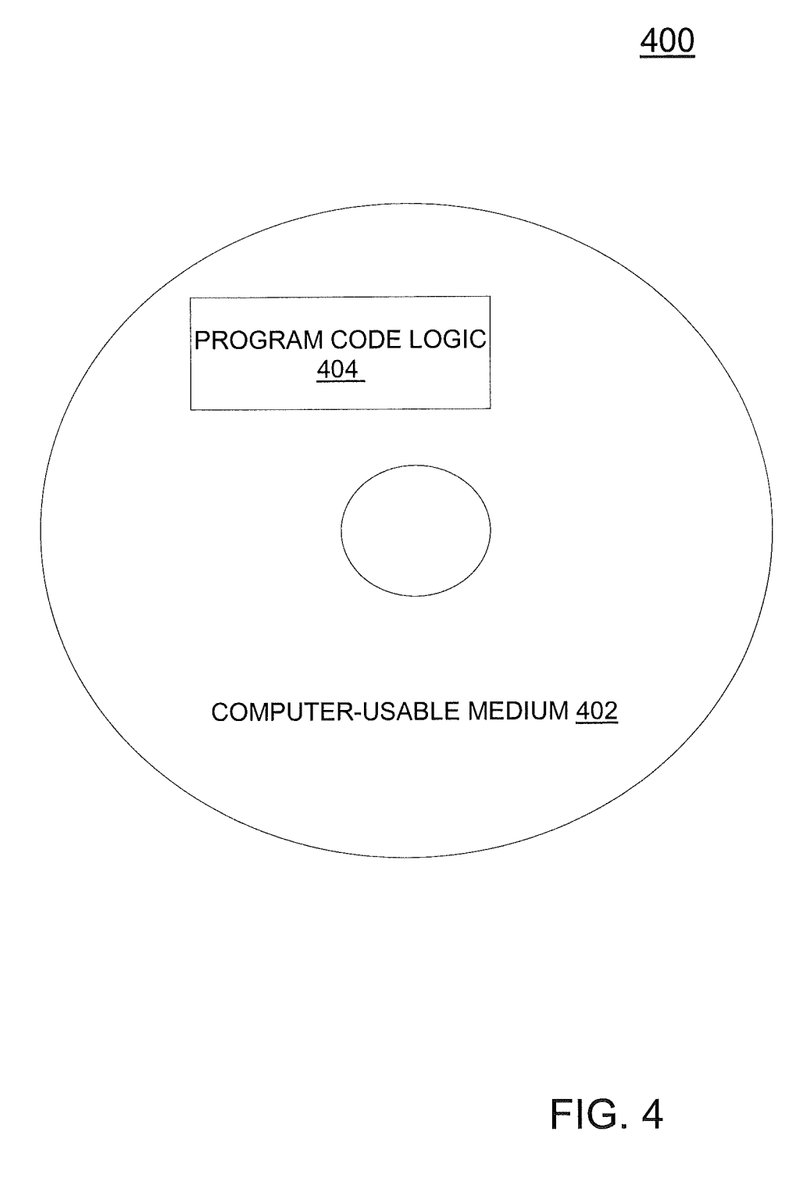
FIG. 4 is a computer program product that may be implemented in an exemplary embodiment.

As described above, embodiments can be embodied in the form of computer-implemented processes and apparatuses for practicing those processes. In exemplary embodiments, the invention is embodied in computer program code executed by one or more network elements. Embodiments include a computer program product 400 on a computer usable medium 402 with computer program code logic 404 containing instructions embodied in tangible media as an article of manufacture. Exemplary articles of manufacture for computer usable medium 402 may include floppy diskettes, CD-ROMs, hard drives, universal serial bus (USB) flash drives, or any other computer-readable storage medium, wherein, when the computer program code logic 404 is loaded into and executed by a computer, the computer becomes an apparatus for practicing the invention. Embodiments include computer program code logic 404, for example, whether stored in a storage medium, loaded into and/or executed by a computer, or transmitted over some transmission medium, such as over electrical wiring or cabling, through fiber optics, or via electromagnetic radiation, wherein, when the computer program code logic 404 is loaded into and executed by a computer, the computer becomes an apparatus for practicing the invention. When implemented on a general-purpose microprocessor, the computer program code logic 404 segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for implementing connected input/output (I/O) hub configuration and management, the computer program product comprising:
a non-transitory storage medium readable by a processing circuit and storing instructions for execution by the processing circuit for performing a method, the method comprising:
configuring a first I/O hub in wrap mode with a second I/O hub, the first and second I/O hubs communicatively coupled to one another via a wrap cable; and
generating data traffic on a main computing subsystem that includes the first and second I/O hubs, comprising:
converting, via the first I/O hub, a request to implement a transaction to an I/O device-readable request packet and transmitting the I/O device-readable request packet over the wrap cable;
converting, via the second I/O hub, the I/O device-readable request packet into a system readable request and transmitting the system readable request over a system bus, the system readable request addressed to a system memory;

in response to receiving, at the second I/O hub, a response to the system readable request from the system memory, converting, via the second I/O hub, the response to an I/O device-readable response packet, and transmitting the I/O device-readable response packet over the wrap cable; and converting, via the first I/O hub, the I/O device-readable response packet into a system readable response packet, and transmitting the system readable response packet over the system bus to a processor that initiated the request to implement a transaction.

2. The computer program product of claim 1, wherein the request to implement a transaction is a load-request-response request.

3. The computer program product of claim 1, wherein the request to implement a transaction is a store-request request.

4. The computer program product of claim 1, wherein the request to implement a transaction is a message signaled interrupt request.

5. The computer program product of claim 1, wherein the first and second I/O hubs are PCIe-enabled hubs.

6. The computer program product of claim 1, wherein configuring the first I/O hub in wrap mode with the second I/O hub includes:

designating the first I/O hub as being in wrap mode in a user-constructed I/O definition file accessible to a host system that is communicatively coupled to the first I/O hub; and designating the second I/O hub as being in wrap mode in a user-constructed I/O definition file accessible to a host system that is communicatively coupled to the second I/O hub.

7. The computer program product of claim 6, wherein each entry in the user-constructed I/O definition file corresponds to physical slot locations for corresponding I/O hub cards that include the first and second I/O hubs, and also a physical slot location for I/O devices.

8. A system for implementing connected input/output (I/O) hub configuration and management, the system comprising:
a first I/O hub;
a second I/O hub communicatively coupled to the first I/O hub via a wrap cable;
a processor in communication with the first and second I/O hubs, at least one of the processor, the first I/O hub, and the second I/O hub including logic for implementing a method, the method comprising:
configuring the first I/O hub in wrap mode with the second I/O hub; and
generating data traffic on a main computing subsystem that includes the processor and the first and second I/O hubs, comprising:
converting, by the first I/O hub, a request to implement a transaction to an I/O device-readable request packet and transmitting the I/O device-readable request packet over the wrap cable;
converting, by the second I/O hub, the I/O device-readable request packet into a system readable request and transmitting the system readable request over a system bus, the system readable request addressed to a system memory of the main computing subsystem;
receiving, by the second I/O hub, a response to the system readable request from the system memory, converting the response to an I/O device-readable response packet, and transmitting the I/O device-readable response packet over the wrap cable; and converting, by the first I/O hub, the I/O device-readable response packet into a system readable response packet, and transmitting the system readable response packet over the system bus to a processor that initiated the request to implement a transaction.

9. The system of claim 8, wherein the request to implement a transaction is a load-request-response request.

10. The system of claim 8, wherein the request to implement a transaction is a store-request request.

11. The system of claim 8, wherein the request to implement a transaction is a message signaled interrupt request.

12. The system of claim 8, wherein the first and second I/O hubs are PCIe-enabled hubs.

13. The system of claim 8, wherein configuring the first I/O hub in wrap mode with the second I/O hub includes:

designating the first I/O hub as being in wrap mode in a user-constructed I/O definition file accessible to a host system that is communicatively coupled to the first I/O hub; and designating the second I/O hub as being in wrap mode in a user-constructed I/O definition file accessible to a host system that is communicatively coupled to the second I/O hub.

14. The system of claim 13, wherein each entry in the user-constructed I/O definition file corresponds to physical slot locations for corresponding I/O hub cards that include the first and second I/O hubs, and also a physical slot location for I/O devices.

15. A method for implementing connected input/output (I/O) hub configuration and management, the method comprising:

configuring a first I/O hub in wrap mode with a second I/O hub, the first and second I/O hubs communicatively coupled to one another via a wrap cable; and generating data traffic on a main computing subsystem that includes the first and second I/O hubs, comprising:

converting, by the first I/O hub, a request to implement a transaction to an I/O device-readable request packet and transmitting the I/O device-readable request packet over the wrap cable;

converting, by the second I/O hub, the I/O device-readable request packet into a system readable request and transmitting the system readable request over a system bus, the system readable request addressed to a system memory;

receiving, by the second I/O hub, a response to the system readable request from the system memory, converting the response to an I/O device-readable response packet, and transmitting the I/O device-readable response packet over the wrap cable; and converting, by the first I/O hub, the I/O device-readable response packet into a system readable response packet, and transmitting the system readable response packet over the system bus to a processor that initiated the request to implement a transaction.

16. The method of claim 15, wherein the request to implement a transaction is a load-request-response request.

17. The method of claim 15, wherein the request to implement a transaction is a store-request request.

18. The method of claim 15, wherein the request to implement a transaction is a message signaled interrupt request.

19. The method of claim 15, wherein the first and second I/O hubs are PCIe-enabled hubs.

20. The method of claim 15, wherein configuring the first I/O hub in wrap mode with the second I/O hub includes:
- designating the first I/O hub as being in wrap mode in a user-constructed I/O definition file accessible to a host system that is communicatively coupled to the first I/O hub; and
- designating the second I/O hub as being in wrap mode in a user-constructed I/O definition file accessible to a host system that is communicatively coupled to the second I/O hub.

21. The method of claim 20, wherein each entry in the user-constructed I/O definition file corresponds to physical slot locations for corresponding I/O hub cards that include the first and second I/O hubs, and also a physical slot location for I/O devices.

* * * * *